Sept. 12, 1961 W. J. MENDLES 2,999,474
CENTRIFUGAL GATE VALVE FOR SEWING MACHINES
Filed Feb. 14, 1958

INVENTOR.
Walter J. Mendles
BY
Marshall J. Breen
ATTORNEY

WITNESS
William Martin

United States Patent Office 2,999,474
Patented Sept. 12, 1961

2,999,474
CENTRIFUGAL GATE VALVE FOR SEWING MACHINES
Walter J. Mendles, Trumbull, Conn., assignor to The Singer Manufacturing Company, Elizabeth, N.J., a corporation of New Jersey
Filed Feb. 14, 1958, Ser. No. 715,280
3 Claims. (Cl. 112—256)

This invention relates to sewing machines and more particularly to a lubricating system for sewing machines.

It is an object of this invention to provide a lubricating system for a sewing machine in which the flow of lubricant to a bearing surface is automatically controlled over the entire speed range from stopped position to maximum high speed running position.

There are many factors which make the consideration of lubrication problems in a sewing machine unique as compared with other types of mechanism. Fabrics which are operated on by a sewing machine are readily damaged by even a slight excess of lubricant, and yet adequate lubrication is essential to the high speed operation demanded of the precision mechanisms in modern sewing machines. Sewing machines are rarely operated at a constant speed; they are continually being stopped and started. Bearing loads, however, are most critical at high speeds and any lubrication system must, therefore, as a first requisite, supply adequate lubricant during high speed operation without supplying an excess of lubricant at low speeds or when the machine is stopped.

As illustrated in the accompanying drawings, the present invention may be used with a lubrication system in which an axial bore in a rotary shaft is used to convey lubricant, by way of ports in the shaft, to bearing surfaces requiring lubrication. In this type of system which is simple, dependable, extremely economical to manufacture and, therefore, highly desirable in a commerical product. The design of the shaft bore, the ports and the means for introducing lubricant into the shaft must be sufficiently generous to attain an adequate flow of lubricant during high speed operation when the effect on the lubricant of high centrifugal forces incident to the rotation of the shaft must be overcome.

A difficulty which has been experienced with this type of system is that at low speeds when the centrifugal forces are greatly diminished, an excess flow of lubricant occurs. The use of wicking, metering plugs and the like to check the lubricant flow at low speeds often work an even greater stoppage of the lubricant at high speeds and have in the past made it necessary in many critical areas in a sewing machine to abandon this simple and economical type of system and resort instead to an expensive, complicated lubricating system.

It is an object of this invention to provide a means for controlling the flow of lubricant in an axial shaft bore at low speeds of operation which will have no deleterious effect upon the conditions which exist at high speeds of operation.

A specific object of this invention is to provide a centrifugally operated valve for use in controlling the flow of a lubricant in an axial shaft bore of a sewing machine.

Other objects and advantages of this invention will appear from the description hereinbelow of a preferred embodiment as illustrated in the accompanying drawings in which.

Figure 1:
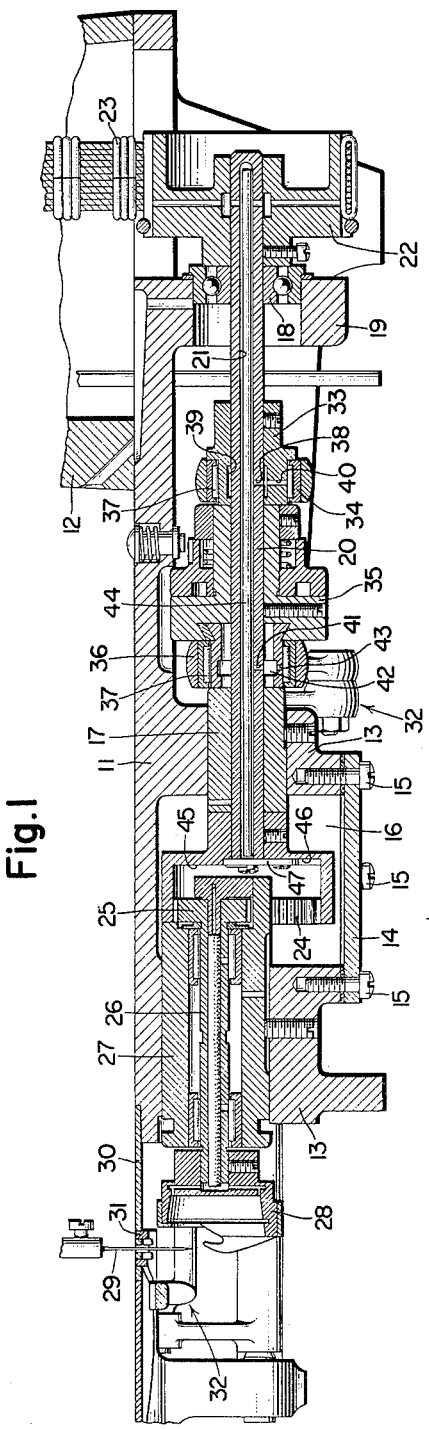
FIG. 1 represents a vertical cross sectional view of the bed portion of a typical sewing machine having a lubricating system of this invention applied thereto.

FIG. 1 of the drawings illustrates a bed 11 and a fragment of the standard 12 of a bracket arm portion of a sewing machine of the type disclosed in the United States patent of Zonis No. 2,267,581, December 23, 1941, to which a lubricating system has been applied in accordance with this invention. Much of the mechanism of the sewing machine and the details of construction thereof have no part in this invention, and therefore the above mentioned United States patent may be referred to for a description of those features of the machine not described herein.

Depending from the bed are walls 13 closed at the bottom by a cover plate 14 secured by screws 15 to define a lubricant reservoir 16. Rotatably journaled in a bushing 17 in the reservoir side wall 13 and in a bearing 18 in a lug 19 depending from the bed is a bed shaft 20 formed with an axial bore 21 which opens into that extremity of the bed shaft disposed within the lubricant reservoir 16.

A pulley 22 fast on the bed shaft 20 is adapted to be driven by a clip belt 23 from a main shaft (not shown) and an internal gear 24 fast on the bed shaft within the lubricant reservoir 16 is disposed in mesh with a pinion 25 carried on a loop taker shaft 26 journaled in a bushing 27 in the reservoir sidewall 13. A loop taker 28 fast on the loop taker shaft 26 cooperates with an endwise reciprocating needle 29 in the formation of stitches.

Operating upwardly through a throat plate 30 in the bed adjacent the needle and loop taker is a feed dog 31 of a four motion feed mechanism of which the actuating linkage is indicated generally as 32 in the drawings. The feed mechanism may be of any conventional construction in which the four motions are derived from two separate actuators. As illustrated in FIG. 1, two of the motions of the feed dog, i.e., lifting into and lowering out of engagement with a work fabric, are derived from a feed lift eccentric 33 fast on the bed shaft 20; the eccentric 33 being embraced by a pitman strap 34 which is operatively connected with the feed actuating linkage. The other two of the four feed motions, i.e., advance and return motions, are derived from an adjustable eccentric 35 carried on the bed shaft and embraced by a pitman strap 36 which is also operatively connected with the feed actuating linkage 32.

The pitman straps 34 and 36 may include needle bearing elements 37 interposed between the pitman straps and the eccentric surfaces. In any event, the driving connection between the straps 34, 36 and the eccentrics 33 and 35 respectively represent the bearing surfaces to be lubricated by the lubricating system of this invention. Lubrication of the feed lift eccentric bearing surfaces is accomplished from the axial shaft bore 21 by means of a radial port 38 in the shaft which opens into an annular groove 39 formed on the inside surface of the eccentric 33. A radial port 40 in the eccentric 33 leads from the annular groove 39 to the bearing surface to be lubricated.

Similarly, lubrication of the feed advance eccentric bearing surface is accomplished from the shaft bore 21 by means of a radial port 41, in the shaft which leads to an annular groove 42 formed on the inside surface of the adjustable eccentric, and a radial port 43 in the eccentric leading from the annular groove 42 to the bearing surface to be lubricated.

Lubricant within the lubricant reservoir 16 when agitated by rotation of the internal gear 24 is thrown in a fine mist form about the lubricant reservoir and in effect pumped thereby into the axial bore 21 of the bed shaft. The lubricant travels along the shaft bore and then outwardly through the ports 38 and 41 and to the bearing surfaces requiring lubrication.

In order to encourage sufficient flow of lubricant to supply the demands at high speeds of operation, when centrifugal forces acting on the system will tend to discourage entry of lubricant into the shaft bore and movement of lubricant along the bore, a rod 44 may be placed within the shaft bore. The contact of the rod 44 with the shaft bore 21 along substantially the entire length of the shaft effects a rapid transmission of lubricant along the rod by a capillary action of the lubricant between the rod and the shaft bore.

At slow speeds of machine operation, however, the internal gear 24 in the lubricant reservoir will not be rotating sufficiently fast to form a fine lubricant mist, but instead a splashing action will occur and large amounts of lubricant may be delivered to the mouth of the shaft bore 21. Moreover, the centrifugal forces being small have practically none of the deterent effect to transmission of the lubricant into and along the shaft bore that they will exert at high speeds of machine operation.

Figure 3:
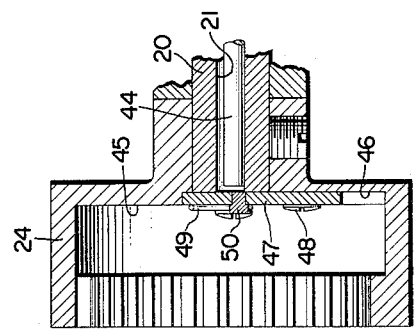
FIG. 3 represents a cross sectional view of the gear and valve taken substantially along line 3—3 of FIG. 2.
Figure 2:
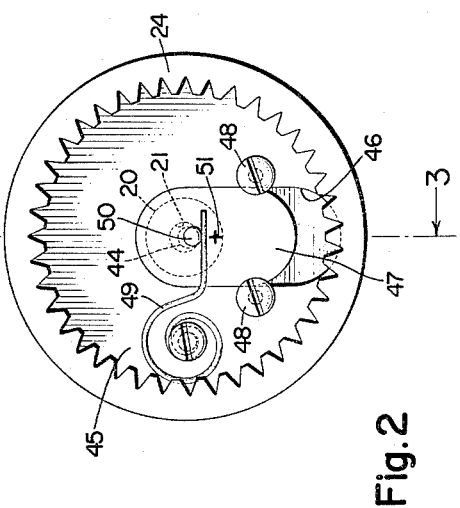
FIG. 2 represents an enlarged end elevational view of the internal gear on the bed shaft of the sewing machine of FIG. 1, illustrating the centrifugally operated valve thereon.

As best illustrated in FIGS. 2 and 3, this invention includes a centrifugally operated valve disposed preferably at the mouth of the shaft bore 21 and effective to open and close the shaft bore between the source of lubricant and the ports 38 and 41 leading to the bearing surfaces to be lubricated.

As illustrated in FIGS. 2 and 3, the inside face 45 of the internal gear is formed with a radially elongated slot 46 which extends over the end of the bed shaft 20. Slidable radially in the slot 46 is a valve gate member 47 which is confined in the slot by a pair of screws 48 of which the heads extend over the slot 46. A wire spring 49 secured to the inside face 45 of the internal gear 24 extends against a pin 50 carried in the valve gate member and serves to urge the valve gate member inwardly toward the center of the internal gear to the position illustrated in FIGS. 2 and 3 closing the shaft bore 21.

The valve gate member 47 is formed such that its center of mass, indicated at 51 in FIG. 2 is disposed radially outward from the axis of rotation of the shaft, along the slot 46. The centrifugal force, therefore, acting on the valve gate member 47 during rotation of the internal gear will tend to counteract the force of the spring 49 and to shift the valve gate member radially outwardly to expose the bore 21 in the bed shaft. When the sewing machine is operated at high speed, the valve gate member will be completely opened, the outer extremity of the slot 46 acting as a stop to prevent excess movement of the valve gate member. In completely opened position, the shaft bore 21 will be unrestricted and the flow of lubricant to the bearings to be lubricated will be completely unrestricted so that a maximum flow of lubricant may be attained during high speed operation when the need for lubricant is greatest.

As the sewing speed decreases and the centrifugal forces acting upon the valve gate member decrease, the spring 49 will act to close the valve gate. Preferably the spring 49 is selected to provide sufficient force to close the valve gate completely while the machine is operating at a slow speed so that as the lubricant in the reservoir 16 begins to be splashed in rather large drops rather than being whipped into a fine mist, as is the case at high speeds, admission of an excess of lubricant into the shaft bore 21 is prevented.

Although illustrated in the preferred embodiment of the drawings as applied to a pair of feed driving eccentrics on the bed shaft, this invention has utility in the lubricating of many other points in a sewing machine as for instance in lubrication of the loop taker, the needle bar drive, the take up drive, etc.

Having thus described the nature of the invention, what I claim herein is:

1. In a sewing machine, a shaft rotatably journaled therein, said shaft formed with a lubricant conducting bore, bearing means associated with said shaft, a lubricant conducting port leading from said shaft bore to said bearing means; means for directing lubricant into said shaft bore, and a sewing speed responsive centrifugally operable valve means associated with said shaft bore for opening said shaft bore between said lubricant directing means and said lubricant conducting port upon attainment of a predetermined speed of rotation of said shaft.

2. In a sewing machine, a shaft rotatably journaled therein, said shaft formed with an axial bore, bearing means associated with said shaft, a lubricant conducting port leading from said shaft bore to said bearing means, means for directing lubricant into said shaft bore, and a centrifugally operated valve means at the mouth of said shaft bore for opening said shaft bore upon rotation of said shaft, said valve means comprising a gate member, means carried for rotation with said shaft at the mouth thereof and formed with a radially elongated slot extending on opposite sides of said shaft bore and terminating each extremity at a different distance from the shaft bore spring means biasing said gate member into one extreme position in said slot against said slot extremity nearest said shaft bore, and said gate member being formed with a center of mass disposed on that side of the axis of said shaft bore opposite the slot extremity nearest said shaft bore.

3. In a sewing machine having a frame formed with a lubricant reservoir, a bed shaft journaled for rotation in said frame and extending into said lubricant reservoir, a cup-shaped internal gear fast on said shaft within said lubricant reservoir and having an inside face disposed transversely of said shaft and beyond one extremity thereof, a loop taker shaft journaled in said frame and extending into said lubricant reservoir, a pinion on said loop taker shaft in mesh with said internal gear, a feed mechanism in said sewing machine frame, feed driving connections with said bed shaft, said bed shaft formed with an axial bore, the inside face of said internal gear being formed with a radial elongate slot exposing said bed shaft bore to said lubricant reservoir, said slot terminating each extremity at a different distance radially outwardly from said shaft bore, a lubricant conducting port leading from said shaft bore to said feed driving connections with said bed shaft, a centrifugally operated valve gate carried in the elongate slot in said internal gear, a leaf spring anchored against said inside face of the valve gate to bias said gate against the slot extremity nearest said shaft bore for closing said shaft bore when said shaft is stopped, and said valve gate having a center mass disposed on that side of the shaft bore opposite the slot extremity nearest the shaft bore for centrifugally opening said shaft bore to said lubricant reservoir upon rotation of said shaft.

References Cited in the file of this patent
UNITED STATES PATENTS

| | | |
|---|---|---|
| 2,081,466 | Tarisien | May 25, 1937 |
| 2,241,870 | Scribner | May 13, 1941 |
| 2,267,581 | Zonis | Dec. 23, 1941 |
| 2,441,942 | Van Ness | May 18, 1948 |
| 2,762,325 | Hale et al. | Sept. 11, 1956 |

FOREIGN PATENTS

| | | |
|---|---|---|
| 712,168 | Great Britain | July 21, 1954 |